US009154431B2

(12) United States Patent
 Loach

(10) Patent No.: US 9,154,431 B2
(45) Date of Patent: Oct. 6, 2015

(54) SYSTEM AND METHOD FOR MANAGING BITRATE ON NETWORKS

(71) Applicant: SANDVINE INCORPORATED ULC, Waterloo (CA)

(72) Inventor: Scot Loach, Waterloo (CA)

(73) Assignee: SANDVINE INCORPORATED ULC, Waterloo, Ontario (CA)

( * ) Notice: Subject to any disclaimer, the term of this patent is extended or adjusted under 35 U.S.C. 154(b) by 181 days.

(21) Appl. No.: 13/889,420

(22) Filed: May 8, 2013

(65) Prior Publication Data

US 2014/0334302 A1 Nov. 13, 2014

(51) Int. Cl.
G06F 11/00 (2006.01)
H04L 1/00 (2006.01)
H04L 12/26 (2006.01)
H04L 12/823 (2013.01)

(52) U.S. Cl.
CPC ..................... *H04L 47/32* (2013.01)

(58) Field of Classification Search
CPC ....................................................... H04L 47/32
USPC ................................. 370/229, 230, 231–235
See application file for complete search history.

(56) References Cited

U.S. PATENT DOCUMENTS

| 7,987,285 | B2 * | 7/2011 | Melnyk et al. | 709/233 |
|---|---|---|---|---|
| 7,991,904 | B2 * | 8/2011 | Melnyk et al. | 709/230 |
| 8,230,105 | B2 * | 7/2012 | Melnyk et al. | 709/233 |
| 8,255,551 | B2 * | 8/2012 | Melnyk et al. | 709/230 |
| 8,621,061 | B2 * | 12/2013 | Melnyk et al. | 709/223 |
| 8,769,141 | B2 * | 7/2014 | Melnyk et al. | 709/231 |
| 2006/0120393 | A1 * | 6/2006 | Lee et al. | 370/412 |
| 2006/0233101 | A1 * | 10/2006 | Luft et al. | 370/229 |
| 2007/0064610 | A1 * | 3/2007 | Khandani et al. | 370/235 |
| 2008/0198748 | A1 * | 8/2008 | Gilfix et al. | 370/235 |

(Continued)

FOREIGN PATENT DOCUMENTS

| EP | 2315392 | 4/2011 |
|---|---|---|
| WO | 1998033300 | 7/1998 |

OTHER PUBLICATIONS

Yasukawa et al., "Concept of Admission Control in Packet Switching Networks Based on Tentative Accommodation of Incoming Flows", Jun. 4, 2005, pp. 349-352, XP019011114, ISBN: 978-3-540-26294-7.

Nandy, et al., "Intelligent Traffic Conditioners for Assured Forwarding Based Differentiated Service Networks", Networking 2000 Broadband Communications, High Performance Networking and Performance of Communication Networks, May 19, 2000, pp. 540-554, Paris, ISSN: 0302-9743.

(Continued)

*Primary Examiner* — Chuong T Ho
(74) *Attorney, Agent, or Firm* — Gowling Lafleur Henderson LLP; Neil Henderson

(57) ABSTRACT

A method and system for managing bitrate of network traffic are provided. The method for managing bitrate of network traffic includes: receiving a packet; retrieving metadata from the packet and associating the packet with at least one traffic aggregate; determining a drop rate for the at least one traffic aggregate based on network flow data; and determining, based on the drop rate and the metadata, to forward or drop the packet. The system includes a packet processing module configured to receive a packet; a deep packet inspection module configured to retrieve metadata from the packet and associate at least on traffic aggregate with the packet; a control module configured to determine a drop rate for the at least one traffic aggregate based on network flow data; and a policy decision module configure to determine whether to forward or drop the packet based on the drop rate and the metadata of the packet.

18 Claims, 9 Drawing Sheets

(56) References Cited

U.S. PATENT DOCUMENTS

2009/0019178 A1* 1/2009 Melnyk et al. ............... 709/233
2011/0080886 A1* 4/2011 Chandrachood et al. ..... 370/329
2013/0086275 A1* 4/2013 Melnyk et al. ............... 709/231
2013/0103827 A1   4/2013 Dunlap et al.
2014/0072032 A1* 3/2014 Melnyk et al. ........... 375/240.02

OTHER PUBLICATIONS

European Patent Office, Extended European Search Report for Appln No. 13166992.1, dated Sep. 20, 2013.

* cited by examiner

SYSTEM AND METHOD FOR MANAGING BITRATE ON NETWORKS

FIELD

The present disclosure relates generally to managing computer networks. More particularly, the present disclosure relates to a system and method for network management related to controlling bitrate.

BACKGROUND

A network provider, such as an Internet Service Provider (ISP) operates a network that generally delivers Internet connectivity to subscribers. A general model of the network of the network provider consists of the core network and the access network. Subscribers connect to the access network, from which the subscribers exchange traffic with hosts on the Internet. This traffic is generally routed through the core network and over a transit link to a transit provider that provides connectivity to other networks.

Typically, the ISP pays the transit provider for this connectivity, generally based on the bitrate that is used. The transit link has a maximum sustainable bitrate before the transit link becomes congested and drops packets.

In order to provide a fair use of network resources, the ISP typically limits the maximum bitrate each subscriber is allowed. Fair use of network resources may apply to any bitrate-constrained link within the transit, core or access network, but the per-subscriber bitrate limit is typically enforced in the access network.

Typically bitrates are directional; that is, they are measured and limited in each of the upstream (from subscribers to the Internet) and downstream (from the Internet to subscribers) directions. However, in a typical access network the downstream bitrate is much higher than the upstream bitrate, since most subscribers are consuming content from the Internet such as web pages, streaming video and file downloads, rather then uploading data to the Internet.

As Internet traffic content becomes more congested and more complex, there remains a need for improved systems and methods for managing networks, and in particular controlling bitrates on a computer network.

SUMMARY

In a first aspect, the present disclosure provides a method for managing bitrate of network traffic including: receiving a packet; retrieving metadata from the packet and associating the packet with at least one traffic aggregate based on network flow data; determining a drop rate for the at least one traffic aggregate; and determining, based on the drop rate and the metadata, to forward or drop the packet.

In one case, retrieving the metadata may include retrieving the direction of the packet and determining whether to drop the packet is based on the direction of the packet.

In other case, if the packet direction is upstream the packet may be a candidate to be dropped to control the downstream bitrate of the network traffic.

In yet another case, retrieving the metadata may include retrieving the protocol associated with the packet.

In still yet another case, if the protocol is a non-congestion controlled protocol, the packet may be a candidate to be dropped, otherwise the packet may be forwarded without management.

In another case, if the protocol is User Datagram Protocol (UDP) the packet may be a candidate to be dropped.

In one case, the method may also include: determining a bitrate of the at least one traffic aggregate; and determining the drop rate for the at least on traffic aggregate based on the bitrate.

In another case, the method may also include: determining a quality score based on the metadata; and determining the drop rate for the at least one traffic aggregate based on the quality score.

In yet another case, the method may also include: determining a maximum bitrate for the at least one traffic aggregate; measuring a total bitrate of the network traffic; and determining the drop rate for the at least one traffic aggregated based on maximum bitrate compared to the total bitrate.

In one case, determining to drop the packet may be a random drop decision.

In another case, determining to drop the packet may be based on protocol awareness.

In yet another case, the method may include determining if the dropping of the packets is reducing the bitrate at the traffic aggregate on the network.

In another aspect, there is provided a system for managing bitrate of network traffic including: a packet processing module configured to receive a packet; a deep packet inspection module configured to retrieve metadata from the packet and associate at least on traffic aggregate with the packet; a control module configured to determine a drop rate for the at least one traffic aggregate based on network flow data; and a policy decision module configure to determine whether to forward or drop the packet based on the drop rate and the metadata of the packet.

In one case, the deep packet inspection module may be further configured to retrieve the direction of the packet and the policy decision module may be further configured to determine whether to drop the packet based on the direction of the packet.

In another case, if the packet direction is upstream the packet may be a candidate to be dropped to control the downstream bitrate of the network traffic.

In yet another case, the deep packet inspection module may be further configured to retrieve the protocol associated with the packet.

In yet another case, if the protocol is a non-congestion controlled protocol, the packet may be a candidate to be dropped, otherwise the packet may be forwarded without management.

In one case, the system may also include: a signaling engine configured to determine a bitrate of the at least one traffic aggregate; and the policy decision module configured to determine the drop rate for the at least on traffic aggregate based on the bitrate.

In another case, the system may include: a signaling engine configured to determine a quality score based on the metadata; and the policy decision module configured to determine the drop rate for the at least one traffic aggregate based on the quality score.

In yet another case, the system may include: a signaling engine configured to determine a maximum bitrate for the at least one traffic aggregate and further configured to measure a total bitrate of the network traffic; and the policy decision module configured to determine the drop rate for the at least one traffic aggregated based on maximum bitrate compared to the total bitrate.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides embodiments for a method and system for managing and controlling bitrates on a computer network. In particular, the embodiments described herein detail a method and system for controlling downstream bitrate on non-congestion controlled protocols. The system is configured to process a received packet. In processing, the system determines the packet direction and policy associated with the packet. The system further establishes an appropriate policy decision in relation to the packet and implements the decision. In some cases, the system is intended to control downstream bitrate by selectively dropping upstream packets, monitoring the effect on downstream bitrate, and modulating the drop rate of the upstream packets. In other cases, the system may use a similar method to control upstream bitrate.

The system may be deployed in the Internet Service Provider's (ISP's) network. The system receives packets from the network, and uses Deep Packet Inspection (DPI) technology to classify the packets. This classification is used to determine the application protocol of the packets, and, whether or not the packets should be managed.

In some cases, managed downstream packets are counted so the system can measure the current bitrate of managed traffic. Managed upstream packets are dropped according to a current drop rate that may be set for any selected points of congestion in the network. Examples of points of congestion are the transit link, the physical cable or radio band to the subscriber (access network), and the like.

Figure 1:
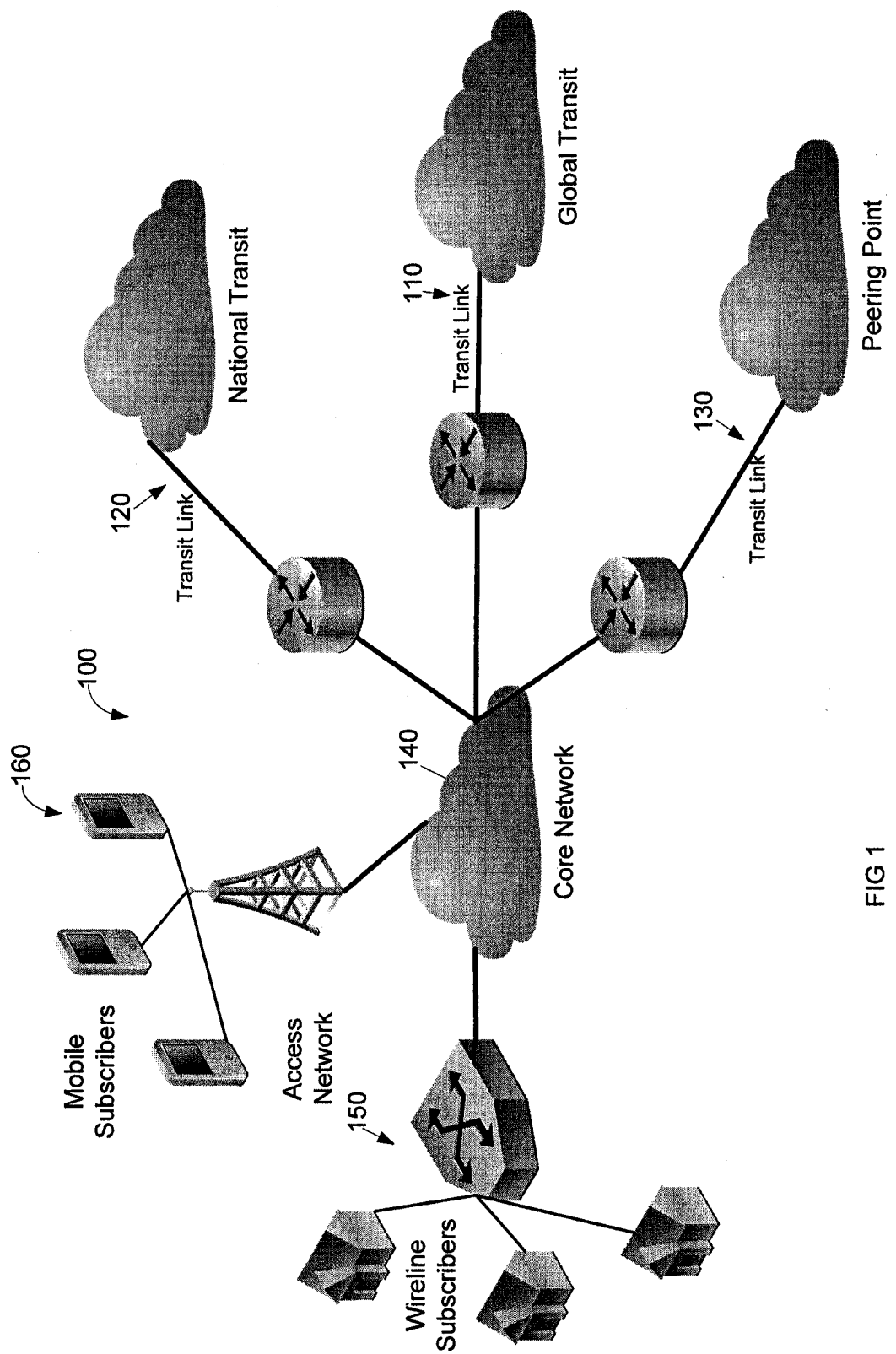
FIG. 1 is a block diagram illustrating an example environment for an embodiment of a system for controlling bitrate.

FIG. 1 illustrates an example of a network 100. The network 100 has three transit links: one for international transit 110, one for national transit 120, and one to a peering point 130. Each of these links may have a different cost to an ISP operating on the network 100. As an example, cost may be typically measured as the 95th percentile of the peak 5-minute downstream bitrate sample over a month. The transit links connect to a core network 140 of the ISP. The ISP provides access networks to a plurality of subscribers. Two sample access networks are shown: a wireline network 150 and a wireless network 160. Examples of wireline networks 150 are using DSL, Cable or Fiber To The Home, or similar technologies. Wireless networks 160 use various wireless technologies to connect mobile devices to the core network 140.

A cost of the access network is the capital cost associated with laying cable and adding network equipment in populated areas. To manage this cost, access networks are typically built with over-subscription; that is, there is less capacity in the access network than the sum of the capacity of each subscriber. In order to manage the network, each subscriber is typically given a maximum upstream and downstream bitrate that is enforced in the access network to make fair use of network resources in the network.

Embodiments of the methods and systems described herein are intended to address at least a problem that arises when downstream traffic exceeds a subscriber's maximum bitrate. In this situation, packets forming the traffic are typically dropped in the access network but, the traffic continues to use a higher bitrate on the transit links, which can lead to higher costs for the ISP or to congestion that impacts subscribers. The embodiments of the method and system are intended to address this problem by reducing or preventing traffic over the subscriber's maximum bitrate from being sent over the transit link. This is intended to reduce or prevent the waste of transporting this traffic over the Internet, through the transit and through the core network, only to drop the packets in the access network.

The embodiments of the method and system may apply to any appropriate point in the network where the bitrate of traffic has a cost or is constrained in some way, and not just the transit link illustrated in FIG. 1, for example any point of congestion on the network. These points in the network may be referred to as "traffic aggregates". A traffic aggregate is a set of traffic that transits some point in the network, such as a transit link. Each packet may be associated with a plurality of traffic aggregates, depending on the design of the network and the need to manage traffic at different network links. Examples of traffic aggregates are: a subscriber, a backhaul link to a mobile base station, a leased link between a cable head-end and the core network, a link between the core network and a transit provider, or the like. Each traffic aggregate may be associated with network flow data, for example, a maximum or minimum bitrate, a tier of service, a quality score, or the like. The network flow data associated with the traffic aggregate may be previously determined by an external system or may be monitored and updated by the system via, for example Deep Packet Inspection of the packets and traffic flow.

Due to the bitrate limits at different points in the path of network packets, it is possible for packets to be sent from the Internet to a subscriber at a higher rate than the path to the subscriber can support. For example, a subscriber may have a maximum bitrate of 10 Megabytes per second (Mbps), which is enforced by the access network. If the subscriber downloads a file, the server on the Internet may be able to send the file through the network path to the access network at 100 Mbps. The ISP does not have any control over the bitrate at which the server is allowed to send, or over the bitrate allowed by the transit links until the packets are received from a transit link; so a server may be able to send at a higher rate than a subscriber is able to or authorized to receive.

Network protocols deal with this situation using the concept of congestion control. For example, Transmission control protocol (TCP), the transport protocol used for Internet traffic, detects congestion by the sender looking for duplicate acknowledgements (acks) from the receiver. The TCP transport protocol is able to limit the maximum bitrate to a subscriber in the access network and may generally result in higher-bitrate senders on the Internet adapting to this bitrate and sending at a rate lower than the maximum bitrate of the path through the network to the subscriber.

Non-congestion controlled protocols that are rate-limited in an access network can cause wasted traffic on transit links and in the core network. This wasted traffic can cause higher costs for an ISP and higher costs and reduced quality of experience for subscribers. By limiting the maximum bitrate of each subscriber, the ISP can, in theory, build a network that can be shared between many subscribers with a predictable cost for exchanging data with its transit providers. Due to the bitrate limits, it is possible for packets to be sent at a higher rate than a path can support. The ISP may be subject to fees or costs related to packets that are sent to but not received by subscribers.

Some Internet transport protocols do not have congestion control built in. In particular, the User Datagram Protocol (UDP) transport protocol does not include congestion control technology, so any application protocols built using UDP may implement their own congestion control. For example, the BitTorrent™ application protocol uses UDP for transferring files, and has some form of congestion control built into the application. However, some UDP based application protocols do not have congestion control built in, or the congestion control is not effective. For example, the PPLive™ application protocol uses UDP for streaming video to a subscriber from multiple peers on the Internet, and does not appear to have implemented any congestion control. If neither the transport protocol nor the application protocol has congestion control, a maximum bitrate limitation in the network path, such as in the access network will result in dropped packets that must be retransmitted from the sender.

For example, if traffic is being sent at 100 Mbps from the Internet, and the subscriber's maximum bitrate is 10 Mbps, the transit link and the core network will forward the 100 Mbps bitrate, and about 90% of this will be dropped by the access network. In most cases, the dropped traffic will end up being retransmitted. This retransmitted traffic can be considered "waste" since, in this example, the network will do the work of forwarding a packet about 10 times for every packet that is successfully delivered. This waste leads to higher costs, for example, since the ISP pays the transit provider based on peak bitrate through the access link, the waste from non-congestion-controlled protocols has a direct cost to the ISP, since the ISP may have to pay for the retransmission of the data multiple times. If the transit link becomes saturated as a result, it can have an impact on the quality of experience of other subscribers, since their traffic may be dropped at the transit link as it becomes a point of congestion in the network. In other words, the over-subscription model that was designed to share the network between subscribers while controlling costs can be broken by non-congestion-controlled traffic.

Traffic without congestion control creates a problem for ISPs that cannot be solved by traditional traffic management approaches such as bitrate limiting and traffic shaping. The waste from retransmitted traffic can create other problems as well. For example, in some networks, subscribers pay for traffic by the number of bytes they receive. This is often measured on the Internet side of from the access network; as a result, non-congestion-controlled protocols can lead to subscribers paying for wasted traffic, which may cause subscriber or customer dissatisfaction and churn. This also applies to application protocols that have "insufficient" congestion control built in; for example, the congestion control algorithm is not able to back off enough to prevent a much higher bitrate from being generated than the network can forward to the receiver. There is a class of application protocols that do not have congestion control and will not retransmit lost packets. These are protocols that can continue operating in the face of lost information. For example, Voice over Internet Protocol (VoIP) and real-time video communication application protocols will continue operating in the face of dropped packets, with degraded quality.

Figure 2:
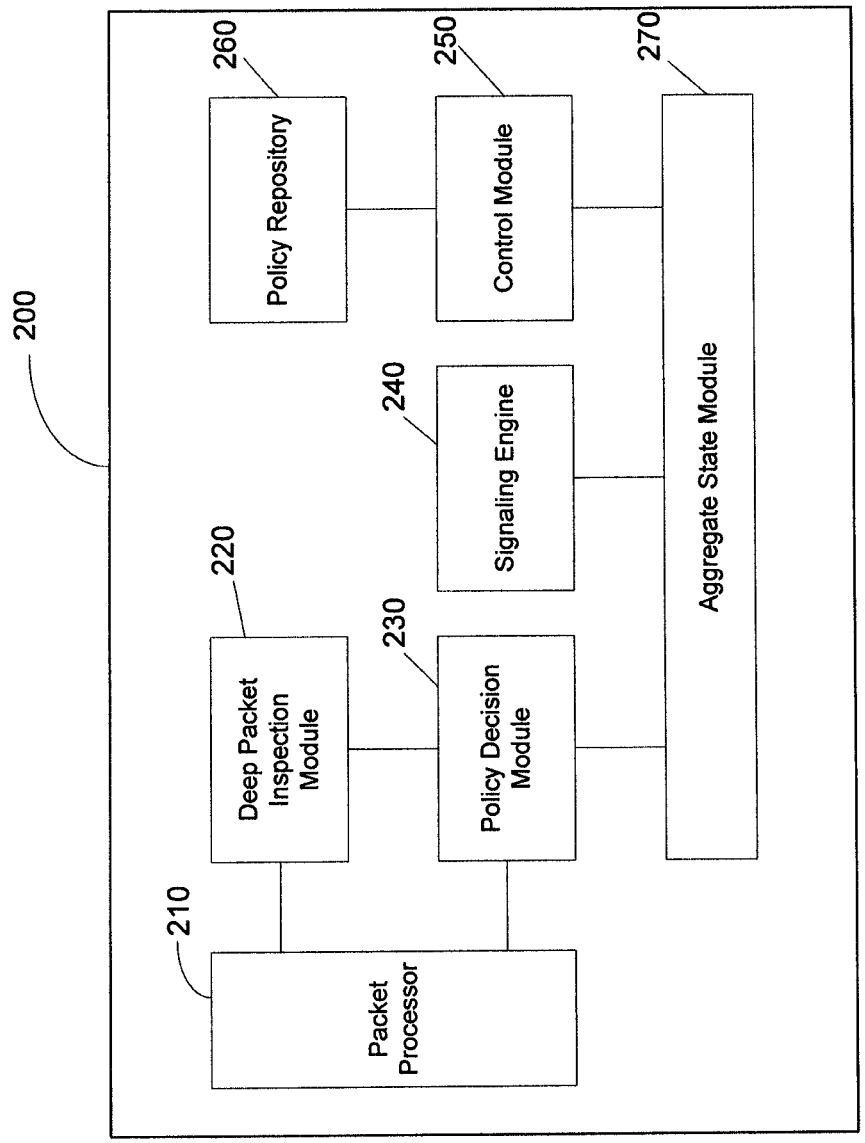
FIG. 2 is a block diagram illustrating an embodiment of a system for controlling bitrate.

FIG. 2 is a block diagram of an embodiment of a system 200 for managing bitrate. A packet processor 210 is responsible for managing network input and output between the network 100, a Deep Packet Inspection (DPI) module 220 and a policy decision module 230. The DPI module 220 is configured to classify network packets and pass the packets to the policy decision module 230. The policy decision module 230 is configured to selectively drop packets. A signaling engine 240 is configured to communicate with external systems to provision bitrate information. A control module 250 uses configuration information retrieved from a policy repository 260 to influence the decisions made by the policy decision module 230. An aggregate state module 270 is configured to store current state data maintained by the signaling engine 240 and the control module 250, and used by the policy decision module 230 and the control module 250.

The packet processor module 210 is configured to manage the interaction of the system 200 with the network 100. One skilled in the art will realize that there are many ways the system 200 may be connected to the network. In one example, the packet processor module 210 may be connected in-line to the network so that the packet processor module 210 intercepts all traffic between, for example, the provider's access network and the core network. In another example, a subset of the traffic is connected to the system; for example, all UDP traffic, since typically UDP traffic is non-congestion-controlled traffic. The packet processor module 210 passes traffic to the DPI module 220 for classification. The DPI module 220 may then mark the traffic and pass the traffic back to the packet processor module 210, which will then pass marked traffic to the policy decision module 230.

The DPI module 220 classifies network packets received from the packet processor module 210. For the purpose of the system 200, the DPI module 220 receives a network packet, determines whether the packet should be managed, and classifies the packet by attaching metadata such as: the direction of the packet, whether or not the packet should be managed by the system 200, the packet type, and the traffic aggregates associated with the packet, such as the subscriber and the transit link of the packet, or the like. The managed packet, along with this metadata, may then be forwarded to the policy decision module 230. It will be understood that the DPI module 220 may also be configured to retrieve or determine further information from a packet which may be used by the system 200 or may be retrieved from the system 200 by external network devices.

The policy decision module 230 receives the managed packet forwarded from the DPI module 220. For downstream packets, the policy decision module 230 is configured to attribute the packet to each traffic aggregate identified by the DPI module 220. For upstream packets, the policy decision module 230 is configured to make a drop decision according to the current drop rate of the traffic aggregates stored in the aggregate state module 270. Packets that are not dropped may be forwarded by passing the packets back to the DPI module 220 or directly to the packet processor module 210.

The signaling engine 240 interfaces with external systems to obtain the total bitrate of traffic aggregates. As this data is received, the data is stored in the aggregate state module 270.

The policy repository 260 is a database that describes the policy for managing network traffic. For each traffic aggregate, a user of the system 200, for example an administrator for the ISP, may set policy for the system, for example, set the maximum total bitrate and the minimum managed bitrate for each traffic aggregate. One skilled in the art will realize that other representations are possible; for example, instead of storing this configuration per subscriber, the system 200 may store configuration for each subscriber tier, and an indirect mapping may be used to lookup the policy based on the tier of the subscriber being managed. In some cases, the policy repository 260 may be separately located and be accessed through the network.

The control module 250 is configured to retrieve policy from the policy repository 260. The control module 250 may also retrieve current measurements and the current drop rate from the aggregate state module 270. The control module 250 runs a control system algorithm to update the drop rate based on the current drop rate, current total and managed bitrate, and the configured maximum bitrate and minimum bitrate. In one example, the control module 250 may be configured to run an instance of the control system algorithm for each traffic aggregate being managed by the system 200. The control module 250 may also detect cases where the method is not having the intended effect of controlling the downstream bitrate. In this case, the control module 250 may automatically handle this situation by stopping management of that traffic aggregate, or the control module 250 may notify an administrator of the system 200 so that the DPI module 220 or system configuration can be tuned differently.

The aggregate state module 270 is configured to store the current measurements and drop rate for each traffic aggregate and may further provide an interface to the policy decision module 230, the signaling engine 240, and the control module 250 to read and update the data.

The system 200 extracts the current total bitrate of at least one traffic aggregate or point of congestion by interfacing with other devices on the ISP's network. This data, along with a managed bitrate measured by counting traffic, and a current drop rate, is used by the control module 250 of the system to set a new drop rate, based on configuration specifying the desired maximum bitrate for each traffic aggregate.

Due to the nature of the relationship between upstream packets and downstream responses, the system 200 is intended to control downstream traffic by monitoring upstream traffic, by reviewing the upstream traffic, the system is intended to determine an appropriate policy decision which may be implemented with respect to the downstream traffic. By selectively dropping upstream packets, or marking upstream packets to be dropped by a selected traffic aggregate, the downstream bitrate will be modified. Further, by monitoring the downstream effect after having the upstream packets dropped, and continuing to manage the upstream traffic the system 200 manages and controls the bitrate of the computer network. The system 200 is intended to be a subscriber and network-friendly solution, since the system is intended to reduce network congestion, waste, cost, and improve subscriber quality of experience by reducing congested traffic and reducing wasted bytes that may be charged to a subscriber.

Figure 3:
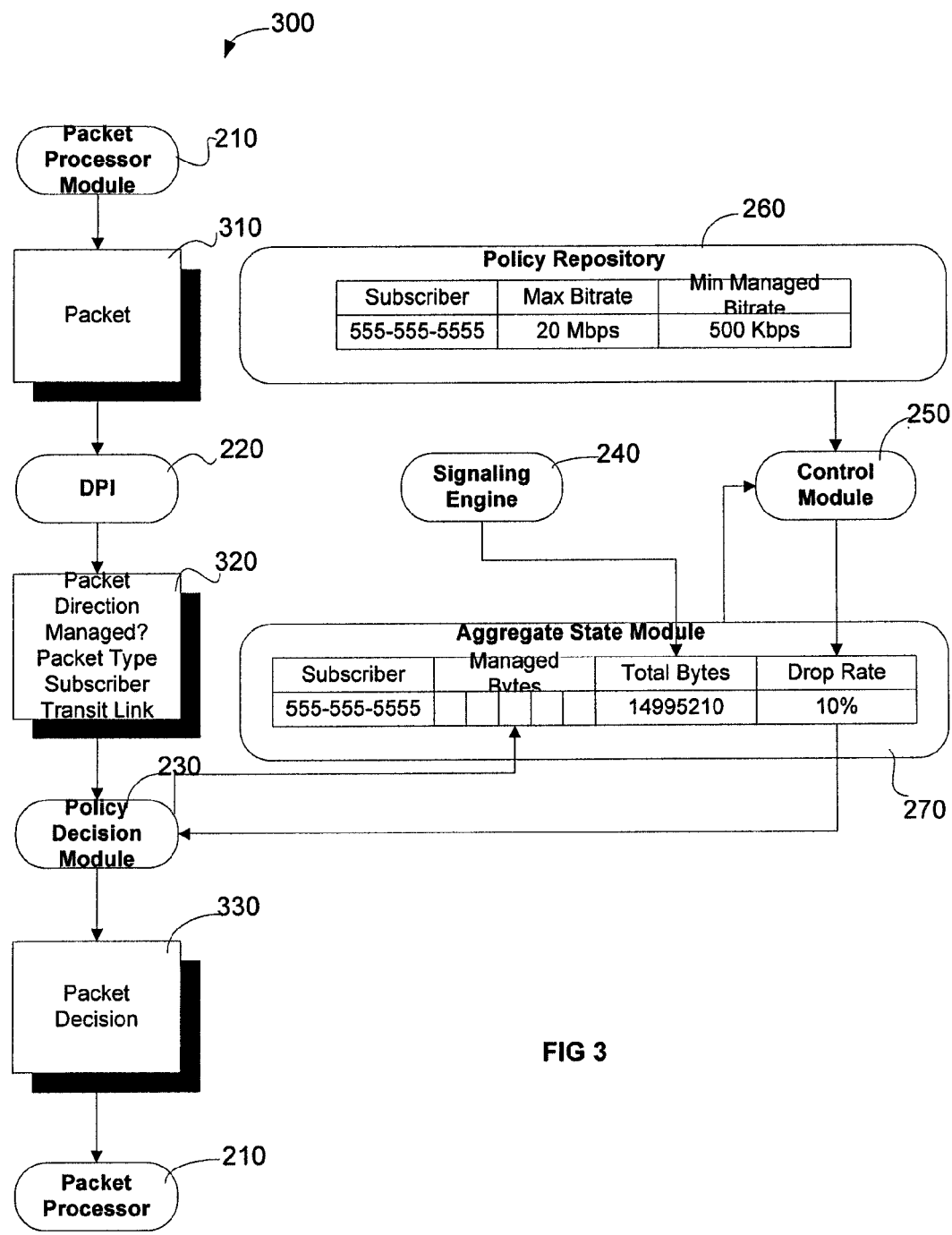
FIG. 3 further illustrates the data flow of the system illustrated in FIG. 2.

FIG. 3 illustrates an example data flow 300 through the system 200 and shows how the system 200 interacts with the data stored in the policy repository 260 and aggregate state module 270. In this example, the system 200 is a simplified system where only a single traffic aggregate is illustrated. It will be understood that the data flow may be amended for the various traffic aggregates managed by the system 200.

At 310, the packet processor module 210 receives the packet. The packet is transmitted to the DPI module 220. The DPI module 220 determines if the packet should be managed, at 320. The DPI module 220 may retrieve metadata from the packet, for example, the packet type, subscriber and transit link associated with the packet. The metadata and packet are passed to the policy decision module 230, which may pass the data to the aggregate state module 270. As shown, the aggregate state module 270 interacts with the signaling engine 240 and may retrieve the number of bytes associated with the bitrate of the traffic aggregate.

The aggregate state module 270 may further interact with the control module 250 which retrieves data from the policy repository 260 to determine the drop rate for the traffic aggregate. The policy repository 260 stores data associated with the traffic aggregate and, in this case, determines the maximum bitrate and minimum managed bitrate for the traffic aggregate.

The aggregate state module 270 stores the data and the policy decision module 230 retrieves the data from the aggregate state module 270. At 330, the decision to forward or drop the packet is made. The packet processor module 210 processes the decision and either forwards the packet, drops the packet, or marks the packet to be dropped by specific traffic aggregate.

Figure 4A:
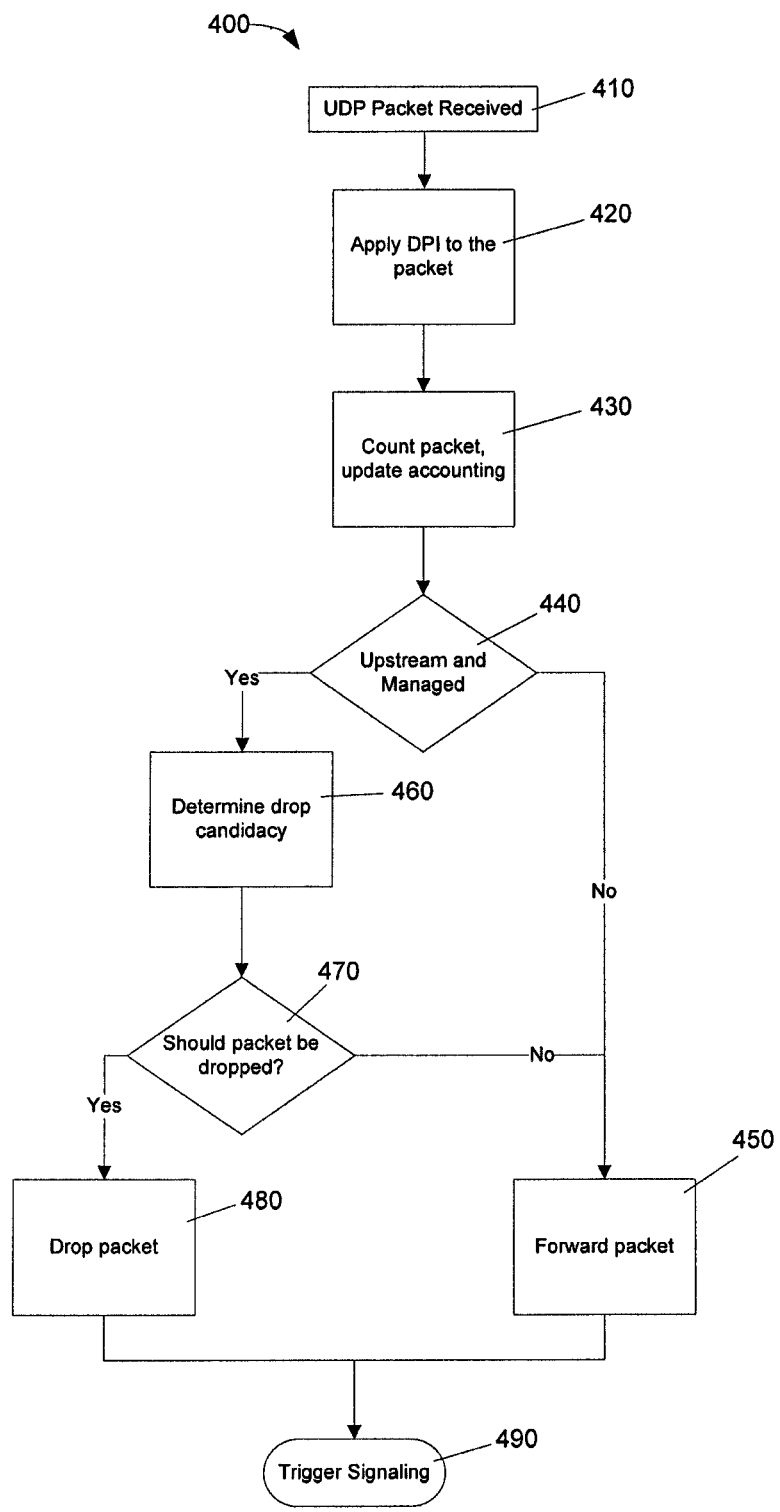
FIGS. 4A to 4C are flow charts illustrating an embodiment of a method for controlling bitrate.
Figure 4B:
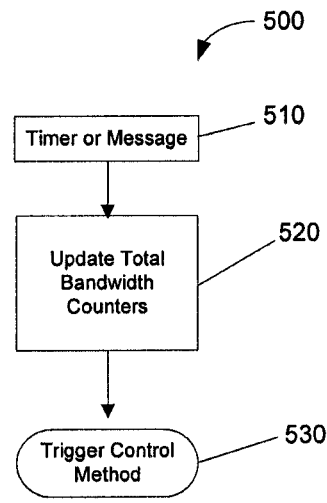
Figure 4C:
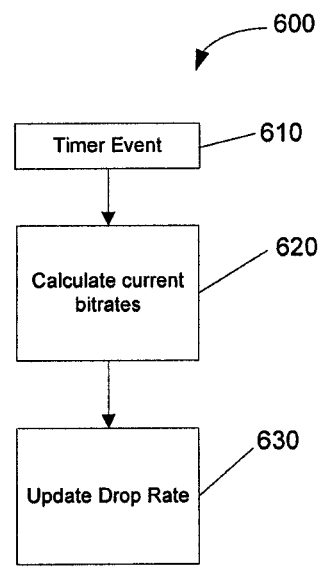

FIGS. 4A to 4C illustrate an embodiment of a method for managing bitrate. The workflows in the method work together in order to realize the intended benefits of the system 200. FIG. 4A illustrates a method 400 for packet processing executed for each packet that transits the system 200. FIG. 4B illustrates a method 500 for packet signaling that may be executed on a periodic schedule or when a message is received. FIG. 4C illustrates a method 600 of the control component of the system 200 that may be executed on a periodic schedule.

FIG. 4A illustrates a method 400 for packet processing. At 410, a packet is received from the network 100. At 420, a Deep Packet Inspection (DPI) module 220 process is applied on the packet. The DPI module 200 classifies the packet and associates the packet with at least one traffic aggregate. In an example, the DPI module 220 classifies each packet as part of an application protocol, and the application protocol is compared to a predetermined list of application protocols that may be managed by the system.

In another example, the DPI module 220 directly classifies packets as belonging to a congestion-controlled application protocol, for example by monitoring the average length and bitrate of traffic flows and the response to dropped packets. The DPI module 220 may use various methods to do classification, such as pattern matching and behavioral analysis. The DPI module 220 may be able to classify the type of packet within the application protocol; for example, whether the packet is part of a file transfer, or a request, or a response, and the type of request or response. The DPI module 220 may also identify other information about the packet, such as the direction of the packet (upstream or downstream) and the subscriber and the transit link associated with the packet, and any other traffic aggregates transited by the packet. The subscriber may be identified by the DPI module 220 keeping track of all IP to subscriber mappings in the system. The transit link of the packet may be identified by interaction with a routing system such as Border Gateway Protocol (BGP). The direction of the packet may be identified by the interface it arrived on, or by a comparison of the IP address to known IP addresses of subscribers. Other ways to classify packets and to identify the metadata about the packets may be used.

At 430, packets are counted by the system 200, in order to update packet counts and bitrates that will be used by later steps in the method. Each downstream packet is counted to each associated traffic aggregate. In an example, the packet is counted into one of a sequence of counters in each traffic aggregate, so that a moving average of the downstream bitrate of the traffic aggregate can be calculated. In this example, a time interval, for example a second in time, a millisecond, a minute, or the like, is associated with each counter in the sequence, and the counter to be updated is selected based on the current time. A plurality of counters may be stored by the system 200, for example by a database or memory module (not shown). For example, for a 5-second moving average, five counters may be maintained in the sequence, with an interval of one second per bin. Packets may be counted into multiple counters for each traffic aggregate, depending on which packets are passed on by the DPI module 220.

In some cases, only packets in managed application protocols may be passed to be counted and the sum of the bytes in these packets are counted as "managed bytes" for each traffic aggregate. In other cases, all network packets may be passed to be counted, and the sum of the total bytes for the aggregate is counted, in addition to the sum of the managed bytes for the aggregate.

At 440, the packets are reviewed and determined if the packet is an upstream and managed packet. If the packet is not an upstream packet and is not a packet for a managed application protocol, the system 200 will generally forward the packet, at 450.

At 460, the system determines the drop candidacy of the managed packets in the upstream direction. A decision is made whether the packet is a candidate for dropping. The decision is made based on the current drop rate of each associated traffic aggregate related to the packet. In some cases, every packet may be a drop candidate, for example a "random drop".

In other cases, only certain types of packets are drop candidates. For example, a UDP-based Peer-to-Peer application protocol sends many upstream messages, such as searches for sources of content, handshake messages, responses to queries, and file content sent to other peers, as well as requests for content from other peers. Only dropping the requests for content from other peers will have an impact on the downstream bitrate; dropping other upstream messages may not provide any benefit, and the random drop algorithm relies on the probability that by randomly dropping packets, some messages requesting content will be dropped. Therefore, if the DPI module 220 is able to identify packets that request file segments, dropping these packets will have the largest impact on the downstream bitrate; so only these packets are drop candidates, which may be referred to as "protocol-aware random drop".

Other criteria may be used to determine whether a packet is a drop candidate subject to the current desired drop rate. In some cases, if the packet is a drop candidate, a random or pseudo-random number between 1 and 100 is generated. If this number is less than or equal to the drop rate of any of the traffic aggregates, the decision to drop the packet is made. Otherwise, the decision to forward the packet is made. One skilled in the art will realize that other methods of dropping packets proportionally to the current drop rate are possible.

At 470, the system 200 determines whether or not the packet should be dropped. At 480, if the decision was to drop the packet, the packet is dropped. One skilled in the art will realize that there are various ways to effect a packet drop, for example, the packet may be directly deleted by the system 200, the packet may be marked and forwarded, to be dropped by a different network device, or by another method that results in a dropped packet. In some cases, dropping by a later device may be done for accounting purposes; for example, if a downstream device is counting bytes for charging purposes, it may be desirable for that device to drop the packet, so that it can be accounted to the subscriber.

At 450, if the packet was not a managed packet in the upstream direction, or if the decision was to forward the packet, the packet is forwarded. The goal of forwarding the packet is to put the packet back on the packet's original path through the network 100. For example, if the packet was intercepted by a transparent layer-2 device such as a switch, the packet may be sent to the layer-2 destination Media Access Control (MAC) address from the original received packet. In another example, the packet may be forwarded by looking up the destination IP address in a routing table and forwarding it to the layer-2 MAC address of the resulting next-hop router. At 490, the packet processor module 210 or policy decision module 230 passes the packet routing details to a method 500 for signaling as shown in FIG. 4B.

In FIG. 4B, at 510, the signaling engine 240 receives the packet and metadata. At 520, the total bitrate of aggregates is obtained and stored for later use. The manner of obtaining the total bitrate may depend on the associated traffic aggregate. In one example, the total bitrate for a traffic link is obtained by issuing Simple Network Management Protocol (SNMP) queries against an access router. In another example, per-subscriber bitrate is obtained by acquiring or retrieving data records such as Internet Protocol Detail Record (IPDR) or by receiving accounting information from Remote Authentication Dial In User Service (RADIUS) or Diameter signaling. In yet another example, the bitrate of an aggregate is estimated by obtaining sampled data such as Netflow records. Other manners of obtaining the total bitrate data are possible where the total traffic is measured when the packets are received by the system.

In some cases, the total bitrate may not be used at all; the system may work exclusively on the bitrate of managed traffic. In other cases, the system 200 may instead function based on the bitrate of managed traffic and a quality score that measures congestion. In this case, the bitrate of managed traffic is increased when the quality score improves, and decreased when the quality score degrades. In some cases, the quality score may include metrics related to the quality of experience, available buffer, video and/or audio quality and the like.

At 530, the signaling engine 240 triggers the control module 250 as shown in FIG. 4C.

FIG. 4C illustrates a method 600 of the control module 250 for controlling bitrate. In an embodiment, the control module 250 may be invoked by a timer that runs periodically, for example once per second, once per millisecond, once per minute, or the like, at 610. The more often the timer runs, the quicker the system 200 will respond to changes in the bitrate of traffic aggregates. In some cases, the control module 250 is run on every packet as part of the per-packet system.

At 620, the current total and managed downstream bitrate is calculated for each associated traffic aggregate. In an example, the downstream bitrate may be calculated as the moving average over the past 5 seconds by adding all the bytes saved in the five stored counters, multiplying by 8 to convert to bits, and dividing by 5 to get the bitrate in bits per second (bps). In another example, the bitrate may be stored and read by the control module 250 from an external network device. Two bitrates may be calculated for each associated traffic aggregate: the total bitrate of the traffic aggregate, and the bitrate of the managed traffic for the traffic aggregate.

At 630, the control module 250 updates the drop rate for each associated traffic aggregate and the system 200 stores the updated drop rate for each associated traffic aggregate. The control module 250 takes the current bitrate, the configured maximum bitrate, the configured minimum bitrate, and the current drop rate as input. The minimum bitrate is used to avoid starvation of the managed traffic by non-managed traffic; even if traffic is at the maximum, allowing some managed traffic allows the traffic to compete for resources. Based on the input, the control module 250 then selects a new value for the drop rate. The control module may be implemented by for example, a PID controller, a fuzzy logic system or the like.

As a simplified example, a simple control module 250 may function as follows. If the measured total bitrate is greater than the configured total bitrate and the measured managed bitrate is greater than the minimum managed bitrate, then the drop rate is incremented by 1, if it is less than 99%. Otherwise, the drop rate may be decremented by 1 if it is greater than 0%. The system 200 is intended to adapt the drop rate based on changes in the total bitrate and the bitrate of managed traffic. In some cases, the control module 250 may detect cases where the method is not having the intended effect of controlling the downstream bitrate, by detecting that the measured managed bitrate is not changing as a result of changes to the drop rate. In some cases, on detecting that the change in bitrate is not having the intended effect, the system 200 may stop trying to control the bitrate of the traffic. In other cases, the system 200 may notify an administrator.

One skilled in the art will realize that although the method above describes the control of downstream bitrate, the method further applies to control of upstream bitrate, if the point of congestion or traffic aggregate the network provider wishes to control is upstream from the system 200. For example, a per-subscriber upstream bitrate limit may be set at the transit link, to enforce fair usage of available transit. If a subscriber is sending traffic above this rate, then there will be traffic waste through the access network and core network. In this case, the system 200 may control upstream bitrate by modifying downstream traffic.

FIGS. 5 to 8 are graphs illustrating results of an experiment done using a simple bitrate limit for managed packets, comparing with an embodiment of the system 200 described above. These experiments were done using a Peer-2-Peer video streaming application protocol that does not have congestion control.

Figure 5:
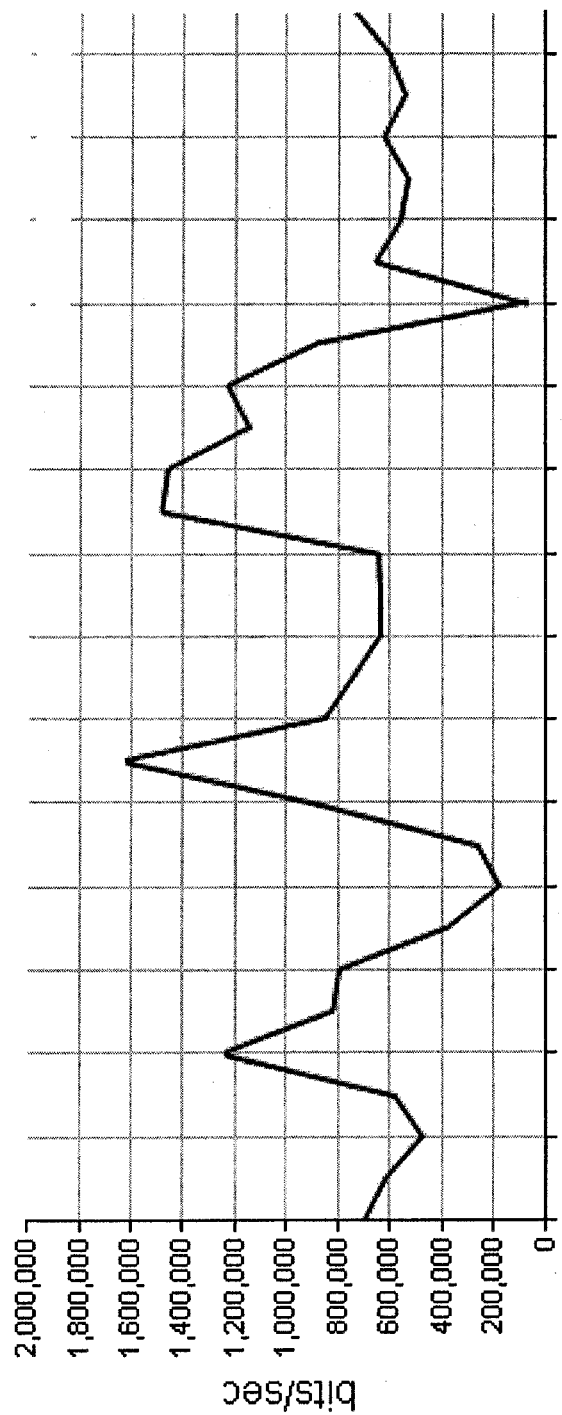
FIG. 5 is a graph illustrating the bitrate per second of a video being played with no bitrate limiting.

FIG. 5 is a graph illustrating the bitrate per second of a video being played with no bitrate limiting, i.e. the traffic flow not being managed by the system 200. The video uses up to about 1.5 Mbps at peak. If this application protocol has no congestion control, any shaping of the bitrate in the network will not impact the incoming rate, but will simply drop packets over that rate after the packets have transited the network to that point.

Figure 6:
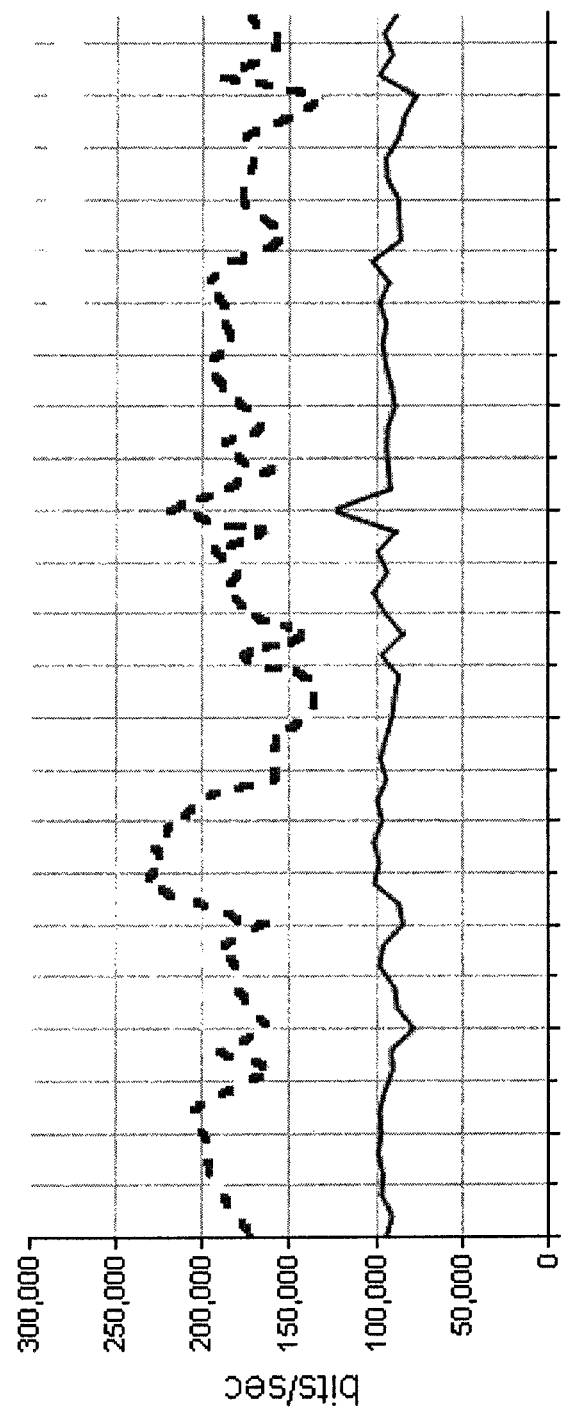
FIG. 6 is a graph illustrating the video being played with regular shaping applied to the downstream packets.

FIG. 6 is a graph illustrating a video being played with regular shaping applied to the downstream packets. The shaper is set to 100 Kbps. The graph shows that the shaper is quite accurate. However, the higher line on the graph shows the bitrate coming into the network, which is higher than the shaper rate. This graph illustrates an example of insufficient congestion control as the traffic between the bitrate control line and the top line is waste. This waste leads to extra transit cost and wasted network processing.

Figure 7:
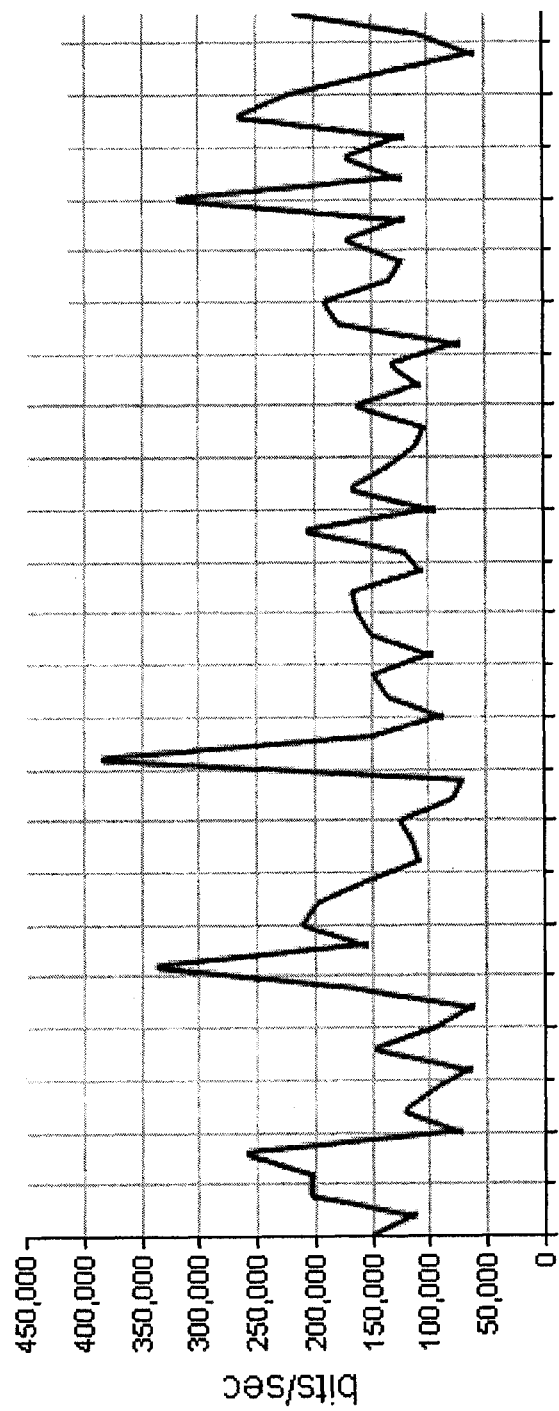
FIG. 7 is a graph illustrating the video being played with the random drop algorithm being applied by the system.

FIG. 7 is a graph illustrating a video being played, with the random drop algorithm being applied by an embodiment the system 200 to control the downstream bitrate. The graph shows that the bitrate averages a small amount above the configured bitrate, but the bitrate peaks much lower than the unmanaged video, shown in FIG. 5.

Figure 8:
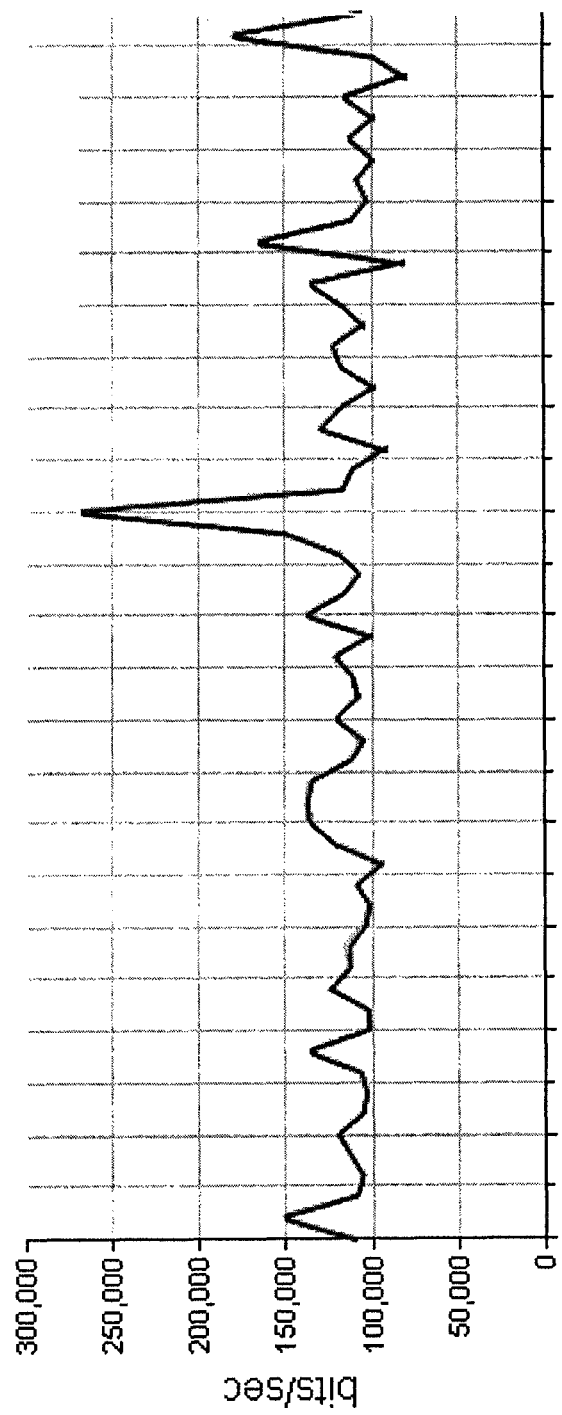
FIG. 8 is a graph illustrating the video being played with the protocol-aware random drop algorithm being used by the system.

FIG. 8 is a graph illustrating a video being played, with the protocol-aware random drop algorithm being used by an embodiment of the system 200 to control the downstream bitrate. The graph shows that the protocol-aware drop algorithm provides a more accurate result than the random drop algorithm. Although the algorithms may be less precise than shaping, the methods detailed herein provide for less waste and reduced costs to the ISP. In some cases, a control system that includes an intelligent component, such as a PID controller, may improve the precision of the algorithm.

In some cases, traffic shaping may be used in coordination with the system 200, which is intended to provide a smoother result. In these cases, some traffic may be wasted based on the above results, but the system is intended to provide for less waste than where only traffic shaping is used.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing bitrate of network traffic comprising:
   receiving a packet;
   retrieving metadata from the packet, wherein the metadata comprises the direction of the packet, and associating the packet with at least one traffic aggregate;
   determining a drop rate for the at least one traffic aggregate based on network flow data; and
   determining, based on the drop rate and the direction of the packet,
   to forward or drop the packet, wherein if the direction of the packet is in one direction, the packet is a candidate to be dropped to control an opposite direction bitrate of the network traffic.

2. The method of claim 1 wherein the packet direction is upstream and the packet is a candidate to be dropped to control the downstream bitrate of the network traffic.

3. The method of claim 1 wherein retrieving the metadata includes retrieving the protocol associated with the packet.

4. The method of claim 3 wherein if the protocol is a non-congestion controlled protocol, the packet is a candidate to be dropped, otherwise the packet is forwarded without management.

5. The method of claim 3 wherein if the protocol is User Datagram Protocol (UDP) the packet is a candidate to be dropped.

6. The method of claim 1 further comprising:
determining a bitrate of the at least one traffic aggregate; and
determining the drop rate for the at least on traffic aggregate based on the bitrate.

7. The method of claim 1 further comprising:
determining a quality score based on the metadata; and
determining the drop rate for the at least one traffic aggregate based on the quality score.

8. The method of claim 1 further comprising:
determining a maximum bitrate for the at least one traffic aggregate;
measuring a total bitrate of the network traffic; and
determining the drop rate for the at least one traffic aggregated based on maximum bitrate compared to the total bitrate.

9. The method of claim 1 wherein determining to drop the packet is a random drop decision.

10. The method of claim 1 wherein determining to drop the packet is based on protocol awareness.

11. The method of claim 1 further comprises determining if the dropping of the packets is reducing the bitrate at the traffic aggregate on the network.

12. A system for managing bitrate of network traffic comprising:
a packet processing module configured to receive a packet;
a deep packet inspection module configured to retrieve metadata from the packet, wherein the metadata comprises the direction of the packet, and
associate at least on traffic aggregate with the packet;
a control module configured to determine a drop rate for the at least one traffic aggregate based on network flow data; and
a policy decision module configure to determine whether to forward or drop the packet based on the drop rate and the direction of the packet wherein if the direction of the packet is in one direction, the packet is a candidate to be dropped to control an opposite direction bitrate of the network traffic.

13. The system of claim 12 wherein if the packet direction is upstream the packet is a candidate to be dropped to control the downstream bitrate of the network traffic.

14. The system of claim 12 wherein the deep packet inspection module is further configured to retrieve the protocol associated with the packet.

15. The system of claim 14 wherein if the protocol is a non-congestion controlled protocol, the packet is a candidate to be dropped, otherwise the packet is forwarded without management.

16. The system of claim 12 further comprising:
a signaling engine configured to determine a bitrate of the at least one traffic aggregate; and
the policy decision module configured to determine the drop rate for the at least on traffic aggregate based on the bitrate.

17. The system of claim 12 further comprising:
a signaling engine configured to determine a quality score based on the metadata; and
the policy decision module configured to determine the drop rate for the at least one traffic aggregate based on the quality score.

18. The system of claim 12 further comprising:
a signaling engine configured to determine a maximum bitrate for the at least one traffic aggregate and further configured to measure a total bitrate of the network traffic; and
the policy decision module configured to determine the drop rate for the at least one traffic aggregated based on maximum bitrate compared to the total bitrate.

\* \* \* \* \*